V. FOGERTY.
Magazine Gun.
No. 2,669 Reissued July 9, 1867
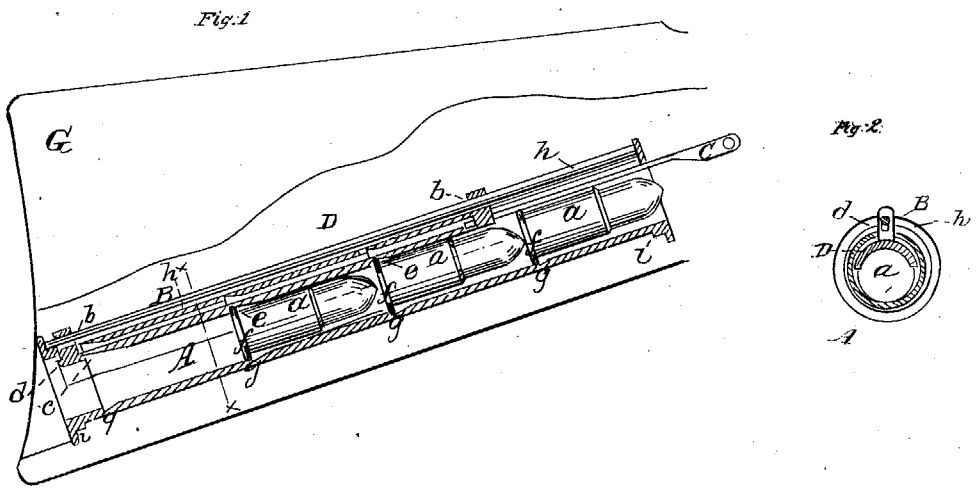
Witnesses
W. Irwin
Theo Busch
Inventor
Valentine Fogerty
Jno Munn & Co
attorneys
N. PETERS, PHOTO-LITHOGRAPHER, WASHINGTON, D. C.

UNITED STATES PATENT OFFICE.

VALENTINE FOGERTY, OF WEST ROXBURY, AND ROYAL E. ROBBINS AND FRANK W. ANDREWS, OF BOSTON, MASSACHUSETTS, ASSIGNEES, BY MESNE ASSIGNMENTS, OF VALENTINE FOGERTY.

IMPROVEMENT IN MAGAZINE FIRE-ARMS.

Specification forming part of Letters Patent No. 46,459, dated February 21, 1865; Reissue No. 2,669, dated July 9, 1867.

*To all whom it may concern:*

Be it known that I, VALENTINE FOGERTY, of Boston, in the county of Suffolk and State of Massachusetts, have invented an Improvement in Magazine Fire-Arms; and I do hereby declare that the following, taken in connection with the drawings which accompany and form part of this specification, is a description of my invention sufficient to enable those skilled in the art to practice it.

The invention relates to the construction and method of operation of the cartridge containing and feeding mechanism of that class of breech-loading magazine fire-arms using flanged metallic-cased cartridges; and said invention consists, primarily, in constructing the magazine in the form of a tube, made in two parts or halves, one of which slides longitudinally upon the other, the inner surface of the tube being of capacity to receive and fit upon the cartridges, one-half of the tube being stationary relatively to the other, and having a series of notches, into which the cartridge-flanges fit, while the sliding half has corresponding notches for receiving the opposite edges of said flanges, these notches being relatively so disposed that a forward movement of the reciprocating half of the magazine-tube slides forward over the inner surface of the stationary semi-tube all the cartridges in the tube, each flange being transferred to a notch in the stationary part of the tube one notch in advance of that in which it last rested, while the rear movement of the sliding semi-tube leaves the cartridges stationary, but carries each movable notch into engagement with the flange next in rear of it.

The drawings represent a magazine embodying the invention, Figure 1 showing a longitudinal section of the same, and showing in outline the stock of the arm containing the magazine; Fig. 2, a cross-section on the line *x x*.

A denotes the magazine, located in the stock G, and having a stationary bed-plate or surface containing a series of notches, *g*, in which the flanges *f* of the cartridges *a* rest, as shown in Fig. 1, the rear face or wall of each notch forming a square shoulder or surface for preventing the cartridge from sliding back, while the lower surface inclines therefrom to permit the cartridge-flange to slide forward out of one notch up to and into the notch next in advance of it at proper time. Opposite to this stationary notched bed-plate or surface is a reciprocating bar, plate, or rack, D, having notches *e*, corresponding with the notches *g*, (or so arranged that when at rest its notches *e* are opposite to the notches *g*,) the notches *e* being similarly formed to the notches *g*, and so that if the bar is slid forward it carries with it the cartridges, whose flanges extend up into its notches, while when it is slid back, if the cartridges be held stationary, the notches *g* will slide away from the flanges, the bar D being made capable of a yielding movement to allow it to slide back freely over the flanges *f*.

The parts being in the position shown at Fig. 1, if the bar or plate D be moved forward it will be obvious that its notches will carry with them the cartridges *a*, (the yield of the bar permitting the cartridges to slide forward out of the notches *g*, as will be readily understood,) and that if the movement of the bar D be continued until each notch *e* comes opposite to the notch *g* next in advance of it, the flange of each advancing cartridge in a notch, *e*, will drop into one of such notches *g*, thus effecting the regular and intermittent progression of the cartridges by moving the bar such distance forward, and then by moving it the same distance back, each forward movement impelling the cartridges forward with the bar, and each rear movement leaving the cartridges in their advanced position, and bringing the notches of the bar into connection with the flanges *f* next in rear of them.

The reciprocating bar D may be hung by ears *d* upon a rod, B, the rod running through slots *b* in the ears, which slots are of such depth as to allow the bar to yield upward, as before explained; and the movements of the bar may be effected through a link, C, to be connected directly or indirectly with the guard-lever, suitable mechanism being employed to determine the extent of forward and back movement of the bar for effecting the proper engagement and disengagement of the notches *g* and *e* and flanges *f*.

I claim—

For use in a breech-loading fire-arm, a divided and notched magazine or cartridge-receiving tube, constructed to operate substantially as set forth.

VALENTINE FOGERTY.

Witnesses:
J. B. CROSBY,
F. GOULD.